May 17, 1960  SHIRO SASAKI  2,937,350
TRANSFORMER AND THE LIKE
Filed Dec. 9, 1955

INVENTOR.
SHIRO SASAKI
BY
ATTORNEY.

United States Patent Office 2,937,350
Patented May 17, 1960

2,937,350

TRANSFORMER AND THE LIKE

Shiro Sasaki, Sendai, Japan

Application December 9, 1955, Serial No. 552,088

Claims priority, application Japan December 13, 1954

3 Claims. (Cl. 336—183)

This invention relates to a transformer and the like and more particularly to such devices which have superior frequency characteristics over a wide frequency range when used in electrical communications. It has been well known that the essential factors for limiting the available range of a transformer are its distributed capacitance and leakage inductance. If we try to reduce the distributed capacitance in a transformer having a definite number of windings, it is obviously necessary to increase the distance between the adjacent lead wires or the adjacent windings, which results in a looser coupling of the windings to increase the leakage inductance therebetween. Accordingly the two factors above referred to are the contradictory conditions. No means for satisfying both the above contradictory conditions have been found by those skilled in the art.

I have proposed here a principle which enables the satisfaction of the above mentioned contradictory conditions. According to my principle, a high impedance transformer which has much less leakage inductance and which is less affected by the distributed capacitance over a wide frequency range can be manufactured.

From results of various experimental investigations I have found that the effect caused by the capacitance distributed between adjacent lead wires or the adjacent loop elements of a transformer is not only related to the static capacity as has commonly been considered, but is also appreciably related to the phase relation of the voltages relatively induced between the elements by changes of voltages and currents in the forms of an alternating current, pulse or transient phenomenon of a direct current and the like. That is, the principle according to this invention will be explained as follows:

Provided there might be a phase difference between voltages induced electro-magnetically in the respective winding elements and also their distributed parts, currents are considered to flow through the distributed capacitance between the winding elements and also their distributed parts. That causes losses. If, on the contrary, there might be no phase difference between the voltages of the winding elements and also their distributed parts, no current will flow through the distributed capacitance. This latter case provides the same results as if no distributed capacitance were in existence between the winding elements and also the distributed parts. The loss due to the above mentioned phase difference between the voltages will, in a single coil, make for a low natural frequency and will, in a transformer, reduce the upper limit of the frequency to be used therewith.

In general, if a voltage is impressed between the terminals of a lead wire or a loop element, the lead wire or the loop element being coupled electro-magnetically and closely to another lead wire or another loop element, the former lead wire or loop element has a corresponding voltage drop distribution therealong due to the current flow. As the result of this the latter lead wire or loop element coupled to the former has a corresponding induced voltage distribution therealong by electro-magnetic induction.

If, in the above case, there were a voltage difference or a voltage phase difference between respectively the voltage drop distributions, the induced voltage distributions, and the voltage drop distribution and the induced voltage distribution currents would flow from the high voltage points to the low voltage points. The distributed capacitance component which causes a loss based upon a voltage phase difference is termed "phase capacitance" throughout the specification and claims. This phase capacitance is determined by the value of the voltage phase difference and amount of the distributed capacitance. For instance, various resonance phenomena such as the primary and higher order resonances due to the main inductance, and the first and the higher order resonances due to the leakage inductance of a transformer are the result of phase capacitance. The above resonance phenomena cannot be fully explained by only the static capacitance or so-called distributed capacitance which is obtained by purely geometrical calculation between lead wires or loop elements.

The resonant frequency of the first order is raised if the phase capacitance is reduced whereas the frequency is reduced if the phase capacitance is increased.

I have found the reduction of the phase capacitance makes it possible to manufacture a transformer or the like having an appreciably smaller leakage loss. It seems that no consideration has heretofore been given to such phase capacitance and that neither winding means nor connecting means of windings for reducing the phase capacitance have been utilized in heretofore known transformers.

It is an object of this invention to provide a transformer having appreciably smaller leakage inductance between primary and secondary windings and minimum phase capacitance.

Another object of this invention is to provide a transformer which is compact and has superior frequency response characteristics owing its high impedance over a comparatively wide frequency range.

A further object of this invention is to provide a transformer having a large transformer ratio with low loss resistance, close coupling and high impedance over a wide range of frequencies.

Other objects, features and advantages of this invention will be apparent from the following detailed description taken in connection with the accompanying drawings, in which.

Figure 1:
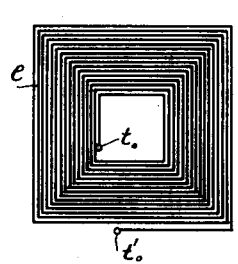
Fig. 1 is a diagrammatic plan view of a winding element preferably adopted to a transformer according to this invention.

Prior to entering into an explanation of the illustrated embodiments of this invention, I will describe some notable experiments relating to phase capacitance which were made in connection with winding elements of the type shown in Figure 1. This general type of winding configuration is preferred for use in a transformer according to this invention.

A winding element of the type diagrammatically shown at $e$ in Fig. 1 is made by winding an insulated lead wire in the form of a flat spiral or of a volute from the center terminal $t_0$ to the outer terminal $t_0'$, the adjacent turns thereof being closely disposed to one another. For example, a winding of this type of 5.2 centimeters outer diameter is made by winding 75 turns of an insulated wire of 0.16 millimeter in diameter. Now, a transformer is constructed by closely coupling two elements wound in this manner, the elements being used as the primary and secondary windings respectively.

Then the natural frequency of the main inductance looking into the transformer at the primary side is measured when an alternating current is passed through the primary side.

In the above measurement, the natural frequency is 2400 kilocycles and the image impedance thereof 5 kiloohms if the two winding elements are disposed closely adjacent each other in with the same sense of the turns, whereas the former value becomes 550 kilocycles and the latter value 500 ohms if the two elements are disposed closely adjacent each other with the turns wound in opposite senses. It is to be noticed that the electro-statically distributed capacitance of the transformer might be substantially equal in either case and that the voltage induced in the primary side in the former case is opposite to that in the latter case. That is, it is recognized that the voltage induced in the secondary side is the same in phase as the voltage of the primary side in the former case, whereas opposite in phase in the latter case. This is the reason why an appreciable difference in frequency characteristics is observed between the cases even though the cases are substantially equal from the standpoint of electro-static capacitance. The phase capacitance between the primary and secondary sides is substantially a maximum in the former case, while it is substantially a minimum in the latter case. Accordingly it will be apparent that by minimizing the phase capacitance characteristics of a transformer can be greatly improved as compared with an ordinary transformer which has heretofore been manufactured without using the idea of phase capacitance.

In accordance with this invention a transformer, an inductance coil or the like which is made based upon the idea of phase capacitance is proposed.

According to this invention the disposition in which the primary and secondary windings are interposed closely adjacent each other with the same sense of the turns for both the windings is adopted and such a disposition is termed "regular interposition" in this specification. It should be noted that the sense of the turns and also the direction of advance of the windings are respectively the same with respect to the respective windings in the regular interposition.

Explanation has been taken mainly in connection with an experimental example of a winding element such as illustrated in Figure 1, but the same phenomena will equally be recognized in the case of a solenoid type winding element. In the case of solenoid type winding elements, however, particular attention should be taken with regard to the sense of the turns and the advance direction of the windings.

In accordance with this invention, any desired number of the primary and secondary winding elements can be selected, the primary and secondary winding elements being alternately and closely disposed in the regular interposition to provide close electro-magnetical coupling therebetween. It is preferable in using a plurality of winding elements that those of the primary and secondary sides are respectively connected in parallel.

Figure 2:
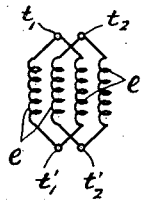
Fig. 2 is a connection diagram for a group of winding elements, by way of example.
Figure 3:
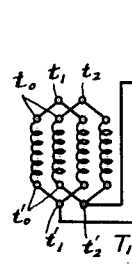
Fig. 3 is a connection diagram of a transformer which is made by connecting six winding groups as shown in Fig. 2.

According to this invention, the transformer of Figure 2 is constituted of winding elements which are closely coupled in the same sense of turns and is of course useful as a transformer independently of the embodiment of Figure 3.

However, the transformer can be used as a unit, that is, any desired number of the units can be adequately combined and connected so as to make another transformer having desired characteristics. For convenience sake, the unit such as illustrated in Figure 2 will be referred to as a "transer" hereinafter.

Now, explanation will be taken in connection with the embodiments of this invention. Fig. 2 shows a connection of a transer, in which four winding elements as shown in Fig. 1 are used, the primary and secondary winding elements being alternately and closely disposed in the same sense of the turns and connected to one another in parallel; $t_1$ and $t_1'$ are terminals of the primary side, and $t_2$ and $t_2'$ those of the secondary side.

The following table is obtained from the measurement taken in connection with a transer in which the primary and secondary winding elements thereof are alternately disposed and the number of the winding elements to be connected in parallel are gradually increased, the dimensions of the winding elements being the same as explained in connection with the element shown in Fig. 1.

| number of winding elements: | | | | | | |
|---|---|---|---|---|---|---|
| primary | 1 | 2 | 3 | 4 | 5 | 12 |
| secondary | 1 | 2 | 3 | 4 | 5 | 12 |
| main inductance in mh | 0.32 | 0.32 | 0.32 | 0.32 | 0.3 | 0.28 |
| leakage inductance in h | 1.9 | 5.2 | 3.2 | 2.4 | 1.6 | 1.1 |
| the primary resonant frequency due to main inductance in mc | 3.5 | 3.1 | 2.9 | 2.8 | 2.7 | 2.4 |

As seen from the table, the leakage inductance is decreased with the number of the winding elements of the transfer to be connected in parallel. That is, the electro-magnetic coupling between the primary and secondary sides becomes closer with the increase of the winding elements to be connected in parallel. In this case, it is apparent from the table that the main inductance and the primary resonant frequency due thereto are substantially maintained constant. These facts mean that the phase capacitance of the transer is scarcely increased in spite of the fact that the geometrical electro-static capacitance established between the primary and secondary winding elements becomes larger in proportion to the number of the elements connected in parallel. This has not been considered by those skilled in the art. Accordingly, such a transer or a transformer made by combining and connecting these transers has the characteristic that the dynamic attenuation at higher frequencies is very small, because all the transers referred to the above table are so constructed as to have substantially minimum phase capacitances.

Next, I will explain a transformer, by way of example, made by interconnecting many transers serving as transformer units.

Fig. 3 shows a transformer which is made by combining and connecting six transers illustrated as at $T_1$–$T_6$ inclusive, each of which is the same as shown in Fig. 2, the transformer ratio being 1:1.

At the primary side a terminal $t_1'$ of the former transer is connected to a terminal of the following transer through a lead wire 1, while at the secondary side a terminal $t_2'$ of the former is connected to a terminal of the following through a lead wire 2.

Both the terminal $t_1$ of the transer $T_1$ and the terminal $t_1'$ of the transer $T_6$ serve as primary terminals of a transformer, and both the terminal $t_2$ of the transer $T_1$ and the terminal $t_2'$ of the transer $T_6$ also as secondary terminals of this transformer. According to this connection, the phase difference of voltages will be scarcely perceptible between the loop of the primary and the opposite loop of the secondary winding element of each transer. Therefore the phase capacitance of this transformer becomes substantially minimum.

It must be noted in case of interconnecting a plurality of transers that the transers should be connected so as to have substantially a minimum phase capacitance; that is, there will be substantially a minimum difference between the distributed voltages in the opposite parts of the primary and the secondary winding elements of the transer.

Fig. 3 shows a connection satisfying such a condition.

Figure 4:
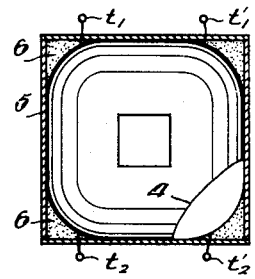
Fig. 4 is a plan view of a transformer shown in Fig. 5 according to this invention, one part of the casing being removed.
Figure 5:
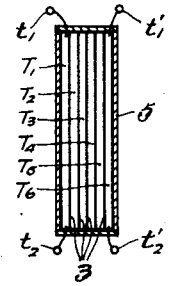
Fig. 5 is a sectional side view of the transformer shown in Fig. 4.

Fig. 4 and Fig. 5 are respectively a plan and side views of the transformer as shown in Fig. 3. It is preferable to minimize the phase capacitance between the opposite sides of the adjacent transers by using, for example, a thin insulating sheet 3 having the thickness of 1.2 mm. as a spacer or by providing such proper space between the adjacent transers, which at the same time makes it possible to select adequately the electro-magnetic coupling between the transers. A sheet of metal can also be used as a spacer.

A core-less transformer can be manufactured by covering the above mentioned transformer surface with suitable insulating paints 4, packing it into a case 5 and packing a stuffing material 6 in the gaps formed therebetween. Such a core-less transformer can be used as a greater parts of usual transformers having fractional band width over 10. Because the size of this transformer is substantially equal to that of an iron core transformer and a transformer having fractional band width over 100 can also be manufactured under some conditions.

Besides, according to the transformer all losses and all limits resulted from the iron core can be avoided. The transformers according to this invention has advantages of sweeping away all faults which result from using the usual iron core transformers, especially in the case of superimposed direct currents and transient phenomena.

Figure 6:
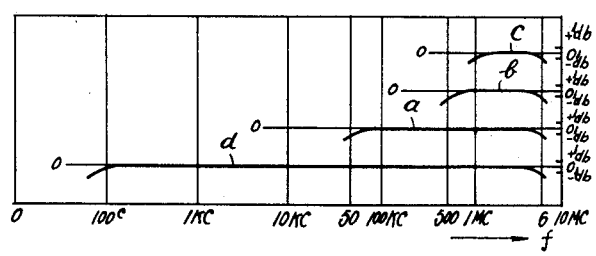
Fig. 6 is a plot of curves illustrating several frequency characteristics of transformers embodying this invention.

Fig. 6 shows the results of measurement for illustrating frequency response characteristics of transformers according to this invention, which are constructed by using the above mentioned winding elements as shown Fig. 1.

The horizontal axis shows the frequency $f$ in kc./s. and vertical axis impedance deviation in decibels, when the load resistance is 2 KΩ.

As seen from the curve $a$, this transformer can cover a wide range of about 50 kc. to 6 mc./s. When so wide frequency range is not required number of transers can be reduced. For instance, the curve $b$ is obtained for two transers and the curve $c$ is obtained for one transer. On the contrary, a transer according to this invention can cover a wider frequency range to very low frequency by only using a suitable iron core. For instance, the curve $d$ is obtained, when a core of Ni-alloy plate of thickness of 0.35 mm. which is usually used in an ordinary transformer is applied to the transformer consisted of 6 transers. In such a case this transformer can indeed cover a very wide frequency range from 80 c./s. to 6 mc./s. A transformer covering the wider frequency range than that described above can be manufactured by means of suitable construction and connection of transers.

Another example of this invention is as follows:

The winding element in this case has 120 turns of an insulated wire of 0.08 mm. in diameter. The primary and secondary sides respectively consist of such winding elements which are successively interposed one another as shown in Fig. 3, 40 winding elements of the primary side and the same number of the secondary side being respectively served as transers. Finally the transformer is manufactured with 3 transers which are connected in series both in the primary and secondary sides so as to make the transformer ratio of 1:1 and has a permalloy core. Accordingly the total number of turns of this transformer is 28,800. This transformer shows from the experimental result that the primary and secondary impedances become 75 ohms respectively; the attenuation deviation falls within 1 db, and the frequency response is substantially flat over a frequency band ranging from about 2 cycles to 10 mega-cycles per second.

In order to obtain a transformer having higher impedance and wider frequency range characteristics, the number of transers connected in series is increased and cores of high quality are used, and it will be understood that such a superior transformer is easily made. Any desired object can be also attained by the combination of transers or combination of some groups of transers having various frequency characteristics.

Generally, in order to decrease the direct current resistance of a coil a wire thereof has been thickened.

As the result, electro-magnetic coupling coefficient of the coil is decreased and skin effect increased. But the electro-magnetic coupling between primary and secondary will become close and at the same time the direct current resistance and the skin effect will be decreased by increasing the number of winding elements to be connected in parallel in a transformer of this invention.

Moreover, in order to manufacture a transformer having the transformer ratio of 3:1 in accordance with this invention, wires of substantially the same thickness are used in both the primary and secondary windings, three wires being wound together at the same plane as the secondary winding with one third turns the primary windings.

Thus the size of the secondary winding element becomes substantially the same as that of the primary and electro-magnetic coupling between the primary and the secondary can be maintained closely as mentioned above. That makes a superior transformer.

A transformer having a desired impedance and large step-up ratio can be manufactured by connecting any desired number of transers, the connection being such that the secondary terminals of the former transer are connected to the primary terminals of the following transer.

If a transformer having a great number of windings or large step-up ratio is required, cookie-type winding elements which are possibly flat in multilayer windings or at random windings may be used. In this case the phase capacitance and coupling between the primary and secondary sides of the winding element can be minimized to the same extent as in the above mentioned cookie-type winding element.

A transformer having any desired transformer ratio can be manufactured by connecting in series either the primary or the secondary of transers and connecting in parallel either another primary terminal or another secondary terminal of transers.

A transformer having any desired transformer ratio can also be obtained by connecting transers in series and parallel.

In this transformer, the primary windings can be connected in series or in parallel, while the secondary windings may be separately used.

A plurality of transers, each having a primary winding element and a secondary winding element, can be used in such manner that the primary or the secondary winding elements are connected in series, whereas the other winding elements are connected in parallel.

A transer can also be manufactured by dividing a winding element into a desired number of parts in the same plane and coupling them closely with other winding elements.

I have explained a transer having cookie-type winding elements which are in regular interposition but such a transer can also be made by other easier processes. Namely, a transer having any desired number of $n$ winding elements which are closely coupled together can be manufactured by winding lead wires of the same number in their respective planes at the same time. A winding element can be manufactured by winding $n$ lead wires in a plane at the same time, the lead wires being coupled closely one another.

Such winding method can be applied to a cookie-type winding element and also to a solenoid type winding element.

Figure 7:
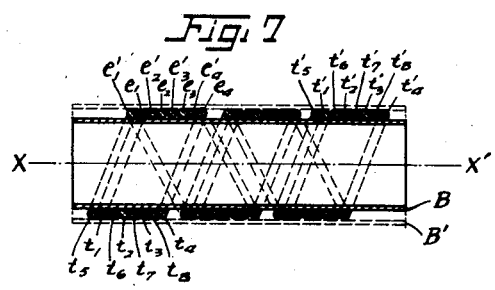
Fig. 7 is diagram of a solenoid type transformer according to this invention.

A transformer of solenoid type can also be manufactured according to the idea of the phase capacitance. Fig. 7 shows one example thereof. In Fig. 7, B is a sectional view of a cylindrical bobbin, and X—X' is a center axis thereof. Eight insulated lead wires are wound closely and in parallel in the same layer, the windings being advanced from the left to the right.

The beginnings of four wires among eight wires can be served as terminals $t_1$–$t_4$, inclusive, of the primary winding elements $e_1$–$e_4$, inclusive, while the beginnings of other four wires as terminals $t_5'$–$t_8'$, inclusive, of the secondary winding elements $e_1'$–$e_4'$. It will be preferable that each group of turns of eight lead wires is loosely coupled to the next group of turns.

$t_1'$–$t_4'$, inclusive, are other terminals of the primary winding elements and $t_5'$–$t_8'$, inclusive, the other terminals of the secondary. Thus the first layer on the bobbin may be considered as a transer. The eight winding elements are wound in the same sense of the turns and the advance direction of the windings are the same so that the phase capacitance between respective winding elements becomes very small. A transer can similarly be manufactured by winding many primary and secondary winding elements as the secondary layer on the first layer through an insulator B' of a desired thickness. The number of transers can be increased by winding the third transer on the outside layer of the second transer and so on. A plurality of transers, each of which is wound by one layer on a separate bobbin, can be combined and connected.

The above mentioned primary and secondary winding elements and many transers should be connected in such a way that the phase capacitance becomes as small as possible. For instance, the beginning terminals $t_1$–$t_4$, inclusive, and the ending terminals $t_1'$–$t_4'$, inclusive, of the primary winding elements illustrated in Fig. 7 may be respectively connected regulary and in parallel, while terminals of the secondary winding elements can be regulary connected in parallel.

In some case the primary and/or the secondary winding elements can also be connected in series. In case of the series connection the end of a winding element should be successively connected to the beginning of the other winding element.

Both the primary and secondary winding elements of the second layer can also be connected with the similar order in series and/or in parallel.

Transers belonging to the first and the second layer may preferably be connected in series, respectively, because it is not desirable to connect transers in parallel, which has different electrical constants owing to unequal diameters in their winding loops.

As above described, in order to have a possibly small phase capacitance, primary and secondary winding elements must be connected in such a way that all the windings are equal in the sense of their turns and also in the advance directions of the windings.

It must be noted that the ordinary turning back winding method adopted in the usual solenoid type transformer makes the phase capacitance much greater than in the transformers of this invention because of the fact that the turning-back winding method results the inverse directions of the winding advance in each layer.

Moreover, in the solenoid type transformer, first transer can be consisted of the primary winding element which is wound on a bobbin as the first layer and the second winding element which is wound closely on the former winding as the second winding element, and similarly the second transer can be constructed on the first transer. Thus any desired number of transers can be formed.

This invention can not only be applied to a transformer, but also to a magnetic amplifier, electric motor and the like having the primary and the secondary windings. This invention can also be applied in the same way to a transformer and the like having more windings than two windings of the primary and secondary sides. In this case all other windings except the primary winding may be considered as the secondary. It will be understood that a coil having desired characteristics for a special use can be manufactured by using either the primary or the secondary winding which is made according to the manner in which the phase capacitance between the winding elements will be minimum. The winding elements, the relative arrangement of the winding elements, the mutual connection of the winding elements and the transer and the transformer consisted of the winding elements can be made by applying technical arts such as printing method, immersing method, blowing method, photography and chemical treatment etc.

It will be understood that the winding element can be manufactured by winding a cable composed of a tubular wire and an inner wire which is disposed coaxially with the tubular wire.

While I have explained particular embodiments of my invention, it will be understood, of course, that I do not wish to be limited thereto since many modifications may be made and I, therefore, contemplated by the appended claims to cover any such modifications as fall within the spirit and scope of my invention.

What is claimed is:

1. A transformer or the like characterized by substanitally maximum coupling between the primary and secondary combined with an unexpectedly low distributed capacitance, comprising at least two single layer primary winding elements and at least two single layer secondary winding elements, each winding element comprising a single conductor wound in a single layer helix having the same number of turns and the same direction of advance as each other winding element, the two secondary helices defining the secondary winding elements being alternately interposed with the two primary helices defining the primary winding elements, the conductors defining the primary helices and the conductors defining the secondary helices being connected together at the respective opposite ends of the helices to connect the primary winding elements in parallel and to connect the secondary winding elements in parallel, and the four helices defining the respective alternate primary and secondary winding elements having respective corresponding turns disposed in successively adjacent relation with a substantially minimum spacing therebetween to provide substantially maximum coupling between the respective corresponding turns of the primary and secondary winding elements combined with substantially minimum phase capacitance for such coupling.

2. A transformer or the like characterized by substantially maximum coupling between the primary and secondary combined with an unexpectedly low distributed capacitance, comprising at least two single layer primary winding elements and at least two single layer secondary winding elements, each winding element comprising a single layer helix having the same number of turns and the same direction of advance as each other winding element, the two secondary helices defining the secondary winding elements being alternately interposed with the two primary helices defining the primary winding elements, the conductors defining the primary helices and the conductors defining the secondary helices being connected together at the respective opposite ends of the helices to connect the primary winding elements in parallel and to connect the secondary winding elements in parallel, and the four helices defining the respective alternate primary and secondary winding elements having respective corresponding turns disposed in successively adjacent relation with a substantially minimum spacing therebetween to provide substantially maximum coupling between the respective corresponding turns of the primary and secondary winding elements combined with substantially minimum phase capacitance for such coupling.

3. A transformer or the like in accordance with claim 2 wherein each winding element is in the form of a flat spiral.

References Cited in the file of this patent
UNITED STATES PATENTS

| | | |
|---|---|---|
| 1,200,233 | Preston | Oct. 13, 1916 |
| 1,426,971 | Faccioli | Aug. 22, 1922 |
| 1,427,833 | McCullough | Sept. 5, 1922 |
| 1,457,619 | Cohen | June 5, 1923 |
| 1,595,838 | Turner | Aug. 10, 1926 |
| 1,616,645 | Wegner | Feb. 8, 1927 |
| 2,680,218 | Keroes | June 1, 1954 |
| 2,791,646 | Keroes | May 7, 1957 |